Patented Apr. 1, 1952

2,591,574

UNITED STATES PATENT OFFICE 2,591,574

NITROGENOUS ANION-EXCHANGE RESINS

Charles H. McBurney, Philadelphia, Pa., assignor to Rohm & Haas Company, Philadelphia, Pa., a corporation of Delaware No Drawing. Application July 5, 1947,
Serial No. 759,309

14 Claims. (Cl. 260—89.7)

This invention relates to anion-exchange resins and to their preparation and use. It relates to nitrogenous resins which are insoluble in aqueous solutions of acids, bases, and salts and which are suitable for the repeated removal of anions from fluids.

The resins of this invention are the reaction products of a primary amine or a secondary amine or mixtures of the two types of amines and an insoluble, cross-linked copolymer of an aromatic monovinyl hydrocarbon and an aromatic divinyl hydrocarbon, which copolymer contains haloalkyl groups having the formula —$C_nH_{2n}X$, wherein X is a chlorine or bromine atom and —$C_nH_{2n}$— is an alkylene group in which $n$ is an integer of a value from one to four.

In the preferred process, resins of the above type are readily prepared by a series of well-defined steps. An insoluble hydrocarbon copolymer is first prepared by copolymerizing a monovinyl hydrocarbon such as styrene or vinyl naphthalene and a divinyl hydrocarbon such as divinyl benzene. Haloalkyl groups are next introduced into the insoluble copolymer by reacting the insoluble copolymer, preferably in the form of small particles, with haloalkylating agents, such as a mixture of an aldehyde and a halogen acid (e. g., paraformaldehyde and hydrochloric acid), or a dihaloalkane and a Friedel-Crafts catalyst (e. g., ethylene dichloride and aluminum chloride), or a haloether and a Friedel-Crafts catalyst, as exemplified below. The resultant haloalkylated copolymer is then reacted with a primary and/or a secondary amine, whereby there is obtained an insoluble, cross-linked, polymeric amine salt. A final washing with an alkaline material such as sodium hydroxide or potassium carbonate converts the amine salt into the free amine, which is then able to adsorb anions.

In the first step, which involves the preparation of the hydrocarbon copolymer, a monovinyl hydrocarbon is polymerized together with a divinyl hydrocarbon. That is, an aromatic hydrocarbon containing one vinyl substituent is copolymerized with an aromatic hydrocarbon containing two vinyl substituents. Hydrocarbons of the first class are typified by the following: Styrene, ortho-, meta-, and para-methyl styrenes, ortho-, meta-, and para-ethyl styrenes, vinyl naphthalene, vinyl anthracene, and the homologues of the above. While divinyl benzene is the divinyl hydrocarbon of first choice, others which are operable include divinyl toluenes, divinyl naphthalenes, divinyl ethyl benzenes, and divinyl xylenes.

In preparing the copolymers, a predominant amount, on a molar basis, of the monovinyl hydrocarbon is employed. That is, more than half of the total number of moles of hydrocarbon employed are those of the monovinyl hydrocarbon. It is preferred that the monovinyl hydrocarbon constitute from 60% to 99.9%, on a molar basis, of the mixture of vinyl hydrocarbons. That is to say, it is preferred that the amount of the divinyl hydrocarbon constitute 0.1% to 40% of the mixture on a molar basis. The latter is a cross-linking agent which imparts insolubility, complexity, and hardness to the copolymer. It has been shown that the use of even less than 0.1% of the cross-linking agent will result in a copolymer which is insoluble in organic liquids, although it may swell in some organic liquids. As the amount of cross-linking divinyl hydrocarbon is increased, the resultant product becomes increasingly dense and correspondingly difficult to haloalkylate. Copolymers of a cross-linking divinyl hydrocarbon and a mixture of two or more monovinyl hydrocarbons are included within the scope of this invention. Such combinations are typified by the following: Styrene, ethyl vinyl benzene, and divinyl benzene; styrene, vinyl naphthalene, and divinyl benzene; m-methyl styrene, styrene, and divinyl benzene; styrene, and divinyl benzene.

The insoluble copolymers of the aromatic mono- and divinyl hydrocarbons may be prepared by a variety of well-known methods. Thus, the monomers may be mixed and then polymerized en masse, or they may be emulsified or otherwise suspended in a liquid medium and then polymerized. Emulsion- and suspension-polymerization, in which the monomers are first suspended in a non-solvent for the monomers such as water or brine solution and are then heated, agitated, and copolymerized, are much preferred because these methods yield hard copolymers in the form of small spheroids, globules, or "beads" and the size of such particles can be regulated and controlled. Thus, particles ranging in size from five to 325 mesh may be prepared. The extremely fine particles of approximately forty to 150 microns in diameter are particularly useful in certain new ion-adsorbing techniques. Furthermore, very fine or porous particles may be haloalkylated and ultimately aminated more rapidly and more extensively than particles which are larger and/or more dense. A modification of the suspension-polymerization method which produces very desirable results involves suspending and polymerizing a solution of the monomers in a chemically inert solvent which is immiscible with the suspending liquid and later removing the occluded or trapped solvent by leaching, drying, or distilling from the hard, polymerized particles. This process yields particles of resin which are more porous due to the escape of the solvent and which, due to their porosity, react more readily. However, large masses or blocks of the polymer may be made and subsequently comminuted before being subjected to the haloalkylating step.

The polymerization of the vinyl compounds is accelerated by means of well-known catalysts which provide oxygen. These catalysts include organic peroxidic agents typified by ozone, ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert.-butyl peroxide, and the barium salt of tert.-butyl hydroperoxide, inorganic agents such as barium peroxide, sodium peroxide, hydrogen peroxide, and the so-called "per" salts such as the water-soluble perborates, persulfates, and perchlorates. The catalysts are employed in suitable amounts ranging from 0.1% to about 2.0% based on the weight of the monomeric material to be polymerized.

The second step in the preparation of the products of this invention is one in which the insoluble, infusible, cross-linked polyvinyl hydrocarbon is haloalkylated. This step involves introducing into the polymer a plurality of bromoalkyl or, preferably, chloroalkyl groups; that is, groups having the general formula —$C_nH_{2n}$—X as described above. While groups containing one to four carbon atoms are embraced by this invention, it is preferred to employ those compounds in which chloromethyl groups, —$CH_2Cl$, are added to the insoluble polymer, because the chloromethyl products are by far the most reactive. The carbon atoms in the group —$C_nH_{2n}$—X may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst. Methods of chloroalkylating which may be used for introducing the —$CH_2Cl$ group and which also serve as guides for introducing —$C_2H_4X$, —$C_3H_6X$, and —$C_4H_8X$ groups are described in "Organic Reactions," vol. I, chapter 3, page 63 et seq. (John Wiley & Sons, Inc., New York city, 1942).

The extent of the haloalkylation reaction may be conveniently determined by a halogen analysis. It is desirable that as many haloalkyl groups as possible be introduced into the insoluble copolymer because the number of such groups determines the number of molecules of the amine which may be subsequently introduced into the resin molecule; and, of necessity, the number of molecules of amine thus introduced determines the ultimate capacity of the resin to adsorb anions. Although resins containing relatively few amino groups have some capacity for adsorbing anions, it is necessary from a practical standpoint to add a large number of such groups in order to produce a resin of sufficiently high capacity as to be commercially attractive. And since, as stated, the number of molecules of amine which can react is determined largely by the number of haloalkyl substituents in the resin molecule, it is important that the minimum number of such substituent haloalkyl groups should be one for every fifteen hydrocarbon nuclei. In the case of a chloromethylated copolymer of styrene and 1% divinyl benzene, such a product would analyze about 2% chlorine. The upper limit is reached when every available position in the aromatic nuclei is haloalkylated. Satisfactory resins of high capacity can be made in which the number of haloalkyl groups, and hence the number of molecules of reacted amine which are introduced, is less than the theoretical maximum. Thus, very valuable resins are those made by aminating copolymers containing from three to six haloalkyl groups for every four aromatic hydrocarbon nuclei.

The next step in the formation of the anion-exchange resin is the amination of the haloalkylated copolymer with a primary and/or a secondary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing amino groups, is freed from the liquid.

It has been found to be advantageous to swell the haloalkylated polymer prior to its reaction with the amine. This swelling facilitates the subsequent amination reaction and may be carried out by soaking the polymer in a suitable liquid, the most common of which are aromatic hydrocarbons such as benzene and toluene. Frequently, the volume of the polymer will increase as much as 100%, although the amount of swelling depends to a great extent upon the amount of cross-linking which has taken place during the preparation of the original polymer. In general, the amount of swelling is inversely proportional to the degree of cross-linking.

The amines which are employed are used in the form of the free base. The prime requirement is that they contain at least one amino-nitrogen atom to which is attached one or two reactive hydrogen atoms. The amines which are preferred in this application are those which are primary or secondary and in which the amino group or groups are attached to a hydrocarbon group. Other amines may be used, however, including those wherein the hydrocarbon group of the amine carries a substituent group. Such amines may be exemplified by ethanolamine and diethanolamine. For best results, the amino compound should not contain substituent groups which are themselves reactive under the conditions employed in aminating the haloalkylated resin.

As stated, the preferred amines are those in which the amino-nitrogen atom is attached to one or two unsubstituted hydrocarbon groups. Primary and secondary amines are operable, as well as mixtures of the two types, and polyamines, including those having primary and secondary amino groups such as polyalkylene polyamines. Tertiary amines also react with the haloalkylated vinyl copolymers but produce thereby anion-exchange resins of quite different characteristics, which are the subject of another application, Serial No. 759,308, filed July 5, 1947. The hydrocarbon portion of the amine may be aliphatic, aromatic, cycloaliphatic, araliphatic, and alkaromatic. The following typify those amines which are all suitable in this invention when used individually or in mixtures with one another: Methylamine, dimethylamine, n-butylamine, isobutylamines, dibutylamines, aniline, benzidine, o-, m-, and p-toluidines, xylidines, α- and β-naphthylamine, naphthalene diamines, benzyl amine, dibenzylamine, phenylene diamine, benzyl aniline, benzyl ethylamine, methyl aniline, cyclohexylamine, dicyclohexylamine, diethylene triamine, triethylene tetramine, tetraethylene pentamine, and propylene diamine.

The following examples serve to illustrate the preferred method of preparing the products of this invention.

*Preparation of the copolymer*

EXAMPLE 1

Into a one-liter, three-necked, balloon flask equipped with thermometer, mechanical stirrer, and reflux condenser was poured four hundred milliliters of water and thirty-four milliliters of a 1.5% aqueous dispersion of magnesium silicate. Agitation was begun and a solution containing 97.5 grams of styrene, one gram of divinyl benzene, and 1.5 grams of ethyl styrene, with one gram of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner, copolymers containing higher amounts of divinyl benzene may be prepared.

EXAMPLE 2

Thirty-four milliliters of a 1½% aqueous dispersion of magnesium silicate was diluted with four hundred millileters of water in a one-liter, three-necked, balloon flask equipped with a mechanical stirrer, reflux condenser, and thermometer. While the above solution was being agitated, another solution containing five grams of toluene, ninety grams of styrene, five grams of divinyl benzene, and one gram of benzoyl peroxide was slowly added. The mixture was then heated to 90° C. and held there for two hours, after which the temperature was raised and the mixture was held at refluxing temperature for one and one-half hours. The mixture was cooled to room temperature, and the small particles of copolymer were removed by filtration. The resin particles were washed several times with water, were then air-dried, and were finally dried in an oven for four hours at 125° C. The final heating removes the toluene which was occluded in the particles of resin and yields particles which are more porous than those produced in the absence of toluene.

EXAMPLE 3

The procedural steps of Example 1 were followed in producing several copolymers from mixtures of β-vinyl naphthalene, styrene, and divinyl benzene. One per cent. benzoyl peroxide was used in every case as a catalyst, 1% divinyl benzene was employed as the cross-linking agent, and the amount of β-vinyl naphthalene varied from 5% to 50% of the copolymerizable mixture.

Also, in a similar way, copolymer was prepared from a mixture of ninety-nine parts of β-vinyl naphthalene and 1% of divinyl benzene. In this case, the copolymerizable mixture was melted and added as a liquid to the suspending medium.

*Haloalkylation of the copolymer*

EXAMPLE 4

Fifty grams of the beads of copolymer prepared in Example 1 above were placed in a one-liter, three-necked, balloon flask equipped with thermometer, mechanical stirrer, and reflux condenser. This amount corresponds to 0.5 mole of styrene in the form of a cross-linked copolymer.

One hundred grams (1.25 moles) of chloromethyl ether, having the formula $CH_3$—O—$CH_2Cl$, was added and the mixture was allowed to stand at room temperature for fifteen minutes, during which time the beads of copolymer swelled. The mixture was then diluted with 115 milliliters of petroleum ether (boiling point, 30° C. to 60° C.) and agitation was begun. The reaction mixture was cooled to 0° C. by means of an ice-salt bath, and, at this point, thirty grams (0.23 mole) of anhydrous powdered aluminum chloride was added in small portions over a period of one hour, after which the mixture was stirred at 0° C. for two hours. Then five hundred milliliters of ice-water was slowly added in order to decompose the excess of aluminum chloride and chloromethyl ether. The resultant mixture was stirred for thirty minutes and was filtered. The beads were first dried in air, then washed several times with water, and finally dried in an oven at 125° C. for two hours.

The beads container 21.97% chlorine by analysis.

*Amination of the haloalkylated copolymer*

EXAMPLE 5

Into a five hundred milliliter, three-necked, balloon flask equipped with thermometer, mechanical stirrer, and a reflux condenser was placed a mixture of 125 grams of tetraethylene pentamine and fifty grams of the chlormethylated product prepared in Example 4. This mixture was heated and stirred at 100° C. for four hours. The mixture thereafter was allowed to stand at room temperature overnight. A total of two hundred milliliters of water was then slowly added and the beads of resin were separated by filtration, after which they were washed twice with water. The wet aminated beads were then stirred for two hours in six hundred milliliters of 10% sulfuric acid solution, during which time any unreacted amine was removed from the resin and the resin was converted into the form of a salt. The beads of resin were filtered off, were washed free of acid, and then were stirred for twenty-four hours in seven hundred milliliters of a 5% solution of sodium hydroxide. Finally, the resin particles were filtered off and were washed in a stream of water until the wash water did not give a pink color with phenolphthalein.

The resin had good anion-exchange capacity and was easily regenerated and repeatedly used for adsorbing anions.

EXAMPLE 6

The process of this example is preferred over that of Example 5.

Into a five hundred milliliter flask like that employed in Example 5 there were placed fifty grams of the chlormethylated product of Example 4 and 115 milliliters of benzene. This mixture was then heated to reflux temperature and held there, during which time the particles of resin swelled. The mixture was then cooled to room temperature, and 125 grams of diethylene triamine was slowly added. When the addition was complete, the reaction mixture was heated to refluxing temperature and held there for four hours. The mixture was maintained at room temperature overnight, after which the particles of aminated resin were removed by filtration, were washed with benzene, air-dried, and finally heated in an oven for two hours at 90° C. The beads were then washed successively with a 10% solution of sulfuric acid, water, and a 5% solution of sodium hydroxide, as described in Example 5.

The final product had high capacity for adsorbing anions and excellent regenerative characteristics.

This method is particularly suitable for aminating with any primary or secondary amine which is soluble in benzene.

EXAMPLE 7

Into a one-liter stainless steel autoclave equipped with stirrer, thermometer, and pressure gauge was placed fifty grams of a chloromethylated resin prepared by the process of Example 4, which had been swelled by immersion in boiling benzene for thirty minutes, followed by filtration therefrom, and cooling. The autoclave and contents were cooled to 20° C., and eighty grams of liquid dimethylamine was poured thereinto and the autoclave immediately sealed. The temperature was raised to 90° C. and maintained at this point for two hours, after which the autoclave was cooled to room temperature, vented, and opened. The aminated resin particles were then filtered, washed with benzene, and dried, after which they were washed successively with acid, water, and sodium hydroxide solution, as described in Example 5.

This method of amination is recommended when a gaseous amine, soluble in benzene, is employed.

The resins of this invention have high capacity for adsorbing anions and do not "throw color." That is, they do not impart color to fluids brought into contact with them, and, in this respect, they have a distinct advantage over other anion-exchange resins based on condensates of phenol and formaldehyde. After having adsorbed anions, the resins may be regenerated by being washed with an alkaline solution such as a solution of potassium hydroxide or of sodium carbonate. The resins are resistant to attrition and have unusual stability at high temperatures. Thus, when the products of this invention were tested for the removal of anions from fluids at 90° C., they did not lose capacity while, during parallel tests, commercial anion-exchange resins lost about one-half of their capacity. The resins are also characterized by the fact that they swell less during use in conventional water-treating equipment than phenolic resins in current commercial production.

I claim:

1. The process of preparing anion-exchange resins wherein a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the general formula —$C_nH_{2n}X$ in which $n$ is an integer of value one to four and X is a member of the group consisting of chlorine and bromine, is reacted with an amine containing a hydrogen atom on the nitrogen atom whereby a polymeric amine salt is formed.

2. The process of preparing anion-exchange resins wherein a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula —$CH_2Cl$ is reacted with an amine containing a hydrogen atom on the nitrogen atom whereby a polymeric amine salt is formed.

3. The process of preparing anion-exchange resins wherein a chloromethylated copolymer of a mixture of styrene and divinyl benzene, said mixture containing a predominant amount of styrene and said copolymer containing on the aromatic nuclei substituent groups of the formula —$CH_2Cl$ is reacted with an amine containing a hydrogen atom on the nitrogen atom whereby a polymeric amine salt is formed.

4. The process of preparing anion-exchange resins wherein a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the general formula —$C_nH_{2n}X$ in which $n$ is an integer of value one to four and X is a member of the group consisting of chlorine and bromide, is reacted with a polyethylene polyamine whereby a polymeric amine salt is formed.

5. The process of preparing anion-exchange resins wherein a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula —$CH_2Cl$ is reacted with a polyethylene polyamine whereby a polymeric amine salt is formed.

6. The process of preparing anion-exchange resins wherein a chloromethylated copolymer of a mixture of styrene and divinyl benzene, said mixture containing a predominant amount of styrene and said copolymer containing on the aromatic nuclei substituent groups of the formula —$CH_2Cl$ is reacted with tetraethylene pentamine whereby a polymeric amine salt is formed.

7. The process of preparing anion-exchange resins wherein particles of an insoluble chloromethylated copolymer of an aromatic monovinyl hydrocarbon and an aromatic divinyl hydrocarbon containing a predominant amount of the aromatic monovinyl hydrocarbon and also containing on the aromatic nuclei substituent chloromethyl groups are reacted with an amine containing a hydrogen atom on the nitrogen atom in the presence of an organic liquid which is a solvent for the amine and is capable of swelling the particles of insoluble copolymer, whereby there is obtained a polymeric amine salt.

8. The process of preparing anion-exchange resins wherein particles of an insoluble chloromethylated copolymer of an aromatic monovinyl hydrocarbon and an aromatic divinyl hydrocarbon containing a predominant amount of the aromatic monovinyl hydrocarbon and also containing on the aromatic nuclei substituent chloromethyl groups are reacted with a polyalkylene polyamine in the presence of an organic liquid which is a solvent for the polyalkylene polyamine and is capable of swelling the particles of insoluble copolymer, whereby there is obtained a polymeric amine salt.

9. An insoluble resinous composition suitable for the removal of anions from fluids which comprises the reaction product of (1) a halomethylated copolymer of a major proportion of a monovinyl aromatic hydrocarbon with from 0.5 to 20.0% of a divinyl aromatic hydrocarbon, the said copolymer containing an average of from 0.2 to 1.2 halomethyl groups per aromatic nucleus, and (2) a primary amine in amount sufficient to furnish at least one ammonia-type nitrogen atom for each substituent halomethyl radical in said halomethylated copolymer.

10. An insoluble resinous composition suitable for the removal of anions from fluids which comprises the reaction product of (1) a halomethylated copolymer of a major proportion of a monovinyl aromatic hydrocarbon with from 0.5 to 20.0% of a divinyl aromatic hydrocarbon, the said copolymer containing an average of from 0.2 to 1.2 halomethyl groups per aromatic nucleus, and (2) a secondary amine in amount sufficient to furnish at least one ammonia-type nitrogen atom for each substituent halomethyl radical in said halomethylated copolymer.

11. An insoluble resinous composition suitable for the removal of anions from fluids which comprises the reaction product of (1) a haloalkylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the general formula $$-C_nH_{2n}X$$

in which $n$ is an integer of value one to four and X is a member of the group consisting of chlorine and bromine and (2) an amine containing a hydrogen atom on the nitrogen atom.

12. An insoluble resinous composition suitable for the removal of anions from fluids which comprises the reaction product of (1) a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substitutent groups of the formula $$-CH_2Cl$$

and (2) an amine containing a hydrogen atom on the nitrogen atom.

13. An insoluble resinous composition suitable for the removal of anions from fluids which comprises the reaction product of (1) a chloromethylated copolymer of a mixture of styrene and divinylbenze, said mixture containing a predominant amount of styrene and said copolymer containing on the aromatic nuclei substituent groups of the formula $$-CH_2Cl$$

and (2) an amine containing a hydrogen atom on the nitrogen atom.

14. An insoluble resinous composition suitable for the removal of anions from fluids which comprises the reaction product of (1) a chloromethylated copolymer of a mixture of an aromatic monovinyl hydrocarbon and an aromatic divinyl hydrocarbon, said mixture containing a predominant amount of said monovinyl hydrocarbon and said copolymer containing on the aromatic nuclei substituent groups of the formula $$-CH_2Cl$$

and (2) a polyethylene polyamine.

CHARLES H. McBURNEY.

REFERENCES CITED

The following references are of record in the file of this patent:

UNITED STATES PATENTS

| Number | Name | Date |
|---|---|---|
| 2,304,637 | Hardy | Dec. 8, 1942 |
| 2,366,007 | D'Alelio | Dec. 26, 1944 |
| 2,366,008 | D'Alelio | Dec. 26, 1944 |
| 2,388,235 | Bowman et al. | Nov. 6, 1945 |
| 2,405,806 | Albrecht et al. | Aug. 13, 1946 |